(12) United States Patent
Lee

(10) Patent No.: US 7,814,261 B2
(45) Date of Patent: Oct. 12, 2010

(54) FLASH MEMORY AND METHOD OF DYNAMICALLY LOADING FIRMWARE OPERATION MODULE IN OPTICAL DRIVE

(75) Inventor: Ki-Ju Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 756 days.

(21) Appl. No.: 11/003,520

(22) Filed: Dec. 6, 2004

(65) Prior Publication Data
US 2005/0188365 A1 Aug. 25, 2005

(30) Foreign Application Priority Data
Feb. 25, 2004 (KR) .................... 10-2004-0012543

(51) Int. Cl.
G06F 12/00 (2006.01)
G06F 13/00 (2006.01)
G06F 13/28 (2006.01)
G06F 9/00 (2006.01)
G06F 15/177 (2006.01)
G06F 11/00 (2006.01)
G06F 9/44 (2006.01)

(52) U.S. Cl. ................ 711/103; 711/102; 711/112; 713/2; 714/8; 717/168; 717/169; 717/173

(58) Field of Classification Search ................ 711/102, 711/103, 112; 713/2; 717/168, 169, 173; 714/8; 395/652
See application file for complete search history.

(56) References Cited

U.S. PATENT DOCUMENTS 5,579,522 A * 11/1996 Christeson et al. ............ 713/2
5,930,504 A * 7/1999 Gabel ............................ 713/2
6,253,281 B1 * 6/2001 Hall .......................... 711/112
6,574,747 B2 * 6/2003 Ginsberg ...................... 714/8
6,889,340 B1 * 5/2005 Bramley, Jr. .................. 714/6

(Continued)

FOREIGN PATENT DOCUMENTS

JP         10-027097          1/1998

(Continued)

OTHER PUBLICATIONS

"Designing an updatable BIOS using flash memory" by Brian Dipert and Don verner, Microprocessors & Microsystems vol. 16 Issue 8 (Oct. 1992) Publisher: Elsevier Science Publishers B.V. pp. 427-446.*

(Continued)

Primary Examiner—Matt Kim
Assistant Examiner—Michael Alsip
(74) Attorney, Agent, or Firm—Staas & Halsey LLP

(57) ABSTRACT

A flash memory in which a code for debugging an optical drive and a code for controlling the optical drive are downloaded when required, the functions of the downloaded code are subsequently executed, and the executed code is then deleted. The flash memory includes a first area where a firmware operation module that is received from an external source is executed and deleted; and a second area allocated to store a code for loading the firmware operation module that is stored in the first area, a code for executing the firmware operation module that is stored in the first area, and a firmware code.

12 Claims, 2 Drawing Sheets

U.S. PATENT DOCUMENTS 7,017,004 B1 * 3/2006 Calligaro et al. ............ 711/102
2004/0054945 A1 * 3/2004 Smith .......................... 714/38

FOREIGN PATENT DOCUMENTS

| KR | 2002-894965 | 11/2002 |
| KR | 2003-70717 | 9/2003 |
| KR | 2003-83118 | 10/2003 |

OTHER PUBLICATIONS

Korean Office Action dated Nov. 28, 2005 for Korean Application No. 10-2004-0012543.

* cited by examiner

FLASH MEMORY AND METHOD OF DYNAMICALLY LOADING FIRMWARE OPERATION MODULE IN OPTICAL DRIVE

CROSS-REFERENCE TO RELATED APPLICATION

This application claims the benefit of Korean Patent Application No. 2004-12543, filed on Feb. 25, 2004, in the Korean Intellectual Property Office, the disclosure of which is incorporated herein in its entirety by reference.

BACKGROUND OF THE INVENTION

1. Field of the Invention

The present invention relates to a flash memory in which a code for debugging an optical drive and a code for controlling the optical drive are downloaded when required, subsequently executed, and then deleted, and a method of dynamically loading a firmware operation module to an optical drive.

2. Description of the Related Art

A flash memory of an optical drive stores a firmware code for driving the optical drive, a code for debugging the optical drive, and a code for controlling the optical drive.

Firmware is generally a mediator that connects the software and the hardware. For example, when several hardware are installed on a main board, the hardware are not driven without firmwares even when the power to the hardware is turned on. Also, to access each apparatus to perform an operation desired by an application program, an appropriate mediator, that is, a firmware, is required. The firmware performs many functions, such as operating a hardware, buffering a collision of the hardware with software, and sending contents controlled by the software to the hardware. The firmware is located in a form area of a computer; therefore, data is stored even when the power is turned off. Hence, the firmware contains several routines required to turn on the power of the computer and several automatically operated programs.

Debugging denotes a process in which an optical disk drive finds and corrects errors, namely, bugs or avoids the errors.

Firmware code increases when functions of the firmware area increased; therefore, there is limited space for adding a code for debugging an optical drive and a code for controlling the optical drive to the optical drive. The optical drive debugging code and the optical drive controlling code, which are used in development of an optical drive are unnecessary in actual user environments. For example, the actual user environment is a regular operation of the flash memory by a user, which does not include operating codes that are used to develop the optical drive, such as debugging code and the optical drive controlling code. Due to an installation of firmware having an increased object size and an addition of codes for debugging, controlling, and performing other operations, a recordable area of the flash memory is reduced.

SUMMARY OF THE INVENTION

The present invention provides a flash memory in which a code for debugging an optical drive and a code for controlling the optical drive are downloaded when required, functions of the code are executed, and the codes are then deleted.

An aspect of the invention also provides a method of dynamically loading a firmware operation module to an optical drive, by which a firmware having various functions can be installed in a small area of the flash memory and efficiently perform operations for debugging and controlling the optical drive in the small area of the flash memory.

According to an aspect of the invention, there is provided a flash memory including a first area allocated to receive, execute, and delete a firmware operation module from an external source, and a second area allocated to store a code for loading the firmware operation module stored in the first area, a code for executing the firmware operation module stored in the first area, and a firmware code.

According to an aspect of the invention, the firmware operation module includes a code for debugging an optical drive and a code for controlling the optical drive.

According to an aspect of the invention, the code for loading the firmware operation module stored in the first area and the code for executing the firmware operation module stored in the first area are allocated to an area other than the first and second areas.

According to an aspect of the invention, there is provided a method of performing a firmware dynamic loading by an optical drive, the method including transferring from the optical drive to a host storing a plurality of firmware operation modules a command for the host to load a firmware operation module to the optical drive, loading the firmware operation module to an arbitrary area of a flash memory of the optical drive using a firmware operation module loading code stored in the flash memory, and transferring a firmware operation module execution code stored in the flash memory to the arbitrary area and executing the firmware operation module using the firmware operation module execution code.

According to an aspect of the invention, after the firmware operation module execution code is transferred to the arbitrary area and executed, the arbitrary area is cleared out.

According to an aspect of the invention, the flash memory includes an area allocated to execute and delete a firmware operation module downloaded from the host, and another area allocated to store a code for downloading the firmware operation module from the previous area, a code for executing the firmware operation module stored in the previous area, and a firmware code.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
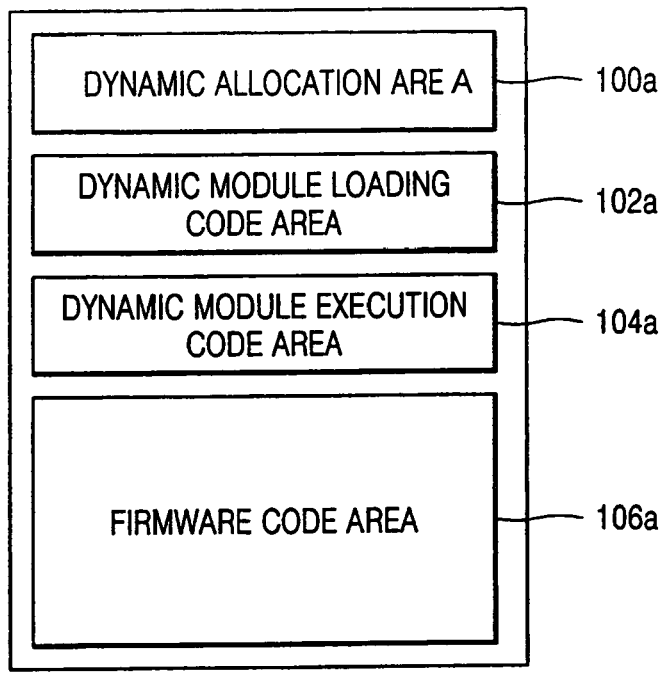
FIGS. 1A and 1B illustrate structures of a flash memory according to an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A flash memory of FIG. 1A includes at least a dynamic allocation area 100*a*, a dynamic module loading code area 102*a*, a dynamic module execution code area 104*a*, and a firmware code area 106*a*. For example, the dynamic module may be stored separately in the flash memory and optionally loaded at a run time.

The dynamic allocation area 100*a* is used to store, execute, and delete a firmware operation module (e.g., a code for debugging an optical drive and a code for controlling the optical drive) received from a host. To perform a firmware operation, an area of a fixed address is allocated to some area of the flash memory. For example, the firmware operation module is stored in the dynamic allocation area 100*a*, the firmware operation module is subsequently executed from the dynamic allocation area 100*a*, and then the firmware operation module is deleted from the dynamic allocation area 100*a*.

An existing flash memory stores both an optical drive debugging code and an optical drive controlling code. However, since a user does not use either the optical drive debugging code or the optical drive controlling code are during regular operation of the flash memory, the optical drive debugging code and the optical drive controlling code are downloaded from a host to the dynamic allocation area 100*a* when required and then executed and deleted.

The dynamic module loading code area 102*a* stores a code for loading a firmware operation module from a host (hereinafter, the code is referred to as a dynamic module loading code). Using the dynamic module loading code, the firmware operation module output from the host is able to be loaded to the dynamic allocation area 100*a*.

The dynamic module execution code area 104*a* stores a code for executing the firmware operation module. The firmware operation module stored in the dynamic allocation area 100*a* can be executed using the dynamic module execution code.

The firmware code area 106*a* stores a firmware code for executing the optical drive.

As illustrated in FIG. 1A, the dynamic module loading code area 102*a* and the dynamic module execution code area 104*a* are separated from each other and store the dynamic module loading code and the dynamic module execution code, respectively.

Figure 1B:
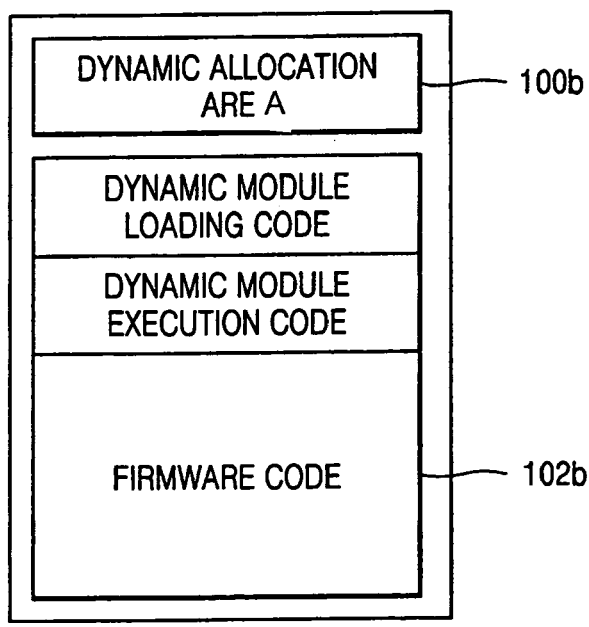

However, a flash memory of FIG. 1B includes a dynamic allocation area 100*b* and a firmware code area 102*b*, which stores a dynamic module loading code, a dynamic module execution code, and a firmware code. These areas correspond to the areas 102*a* and 106*a* of FIG. 1A, so a description thereof will be omitted.

Figure 2:
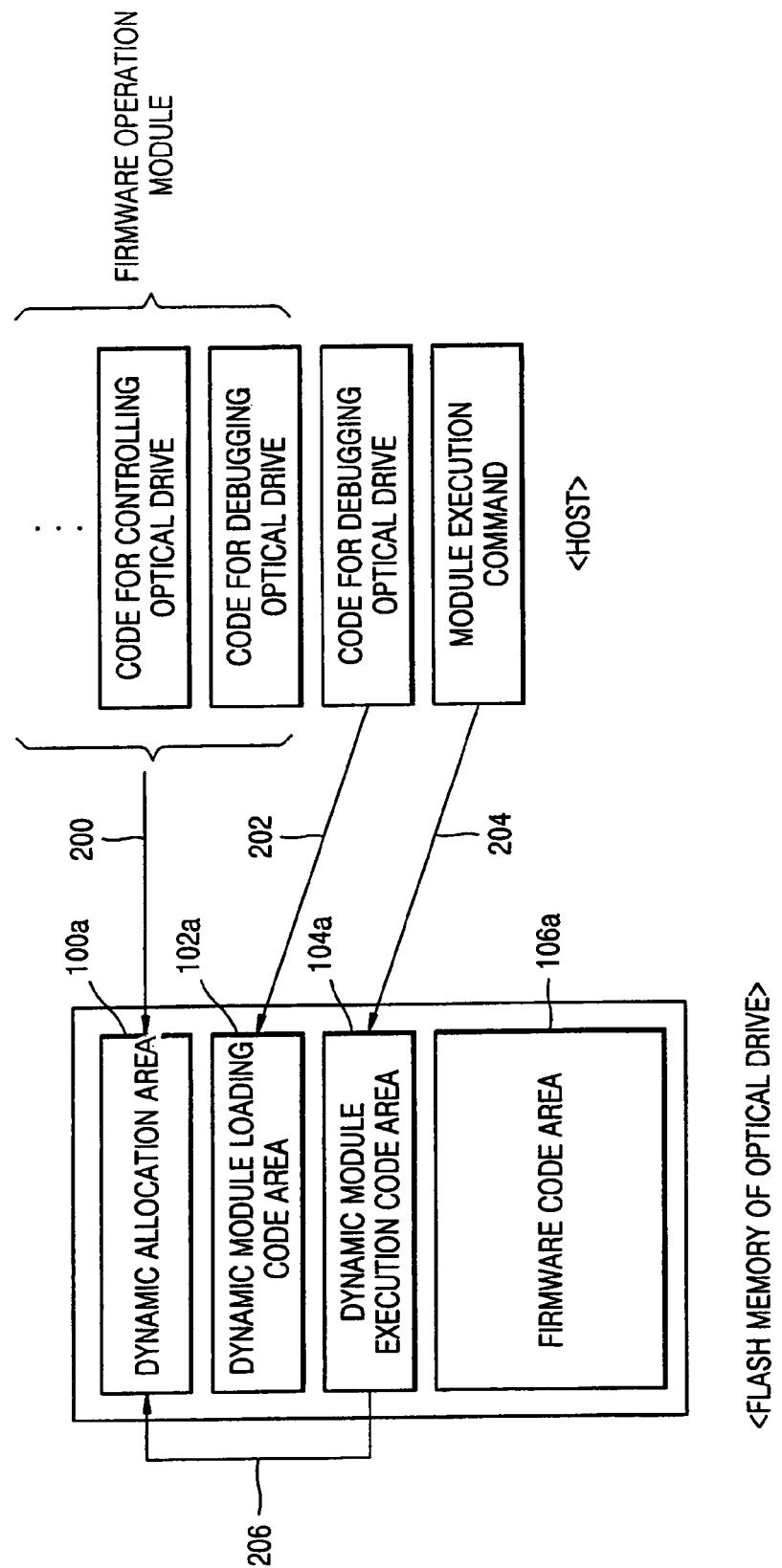
FIG. 2 is a block diagram illustrating a method of dynamically loading a firmware operation module in an optical drive, according to an embodiment of the invention.

FIG. 2 is a block diagram illustrating a method of dynamically loading a firmware operation module in an optical drive, according to an aspect of the invention. FIG. 2 will now be described with reference to FIG. 1A. Inputs/outputs of data to/from the flash memory of FIG. 1A are controlled by a controller (not shown) of an optical drive.

A firmware operation module shown in FIG. 2 is stored in a host. Since a code for debugging an optical drive and a code for controlling the optical drive are unnecessary during regular user operations, these codes are loaded to a flash memory as required so that the codes are executed and deleted in the flash memory. The firmware operation module stored in the host is composed of a plurality of objects.

When the host issues a module loading command to the optical drive in operation 200, a necessary firmware operation module is loaded to the dynamic allocation area 100*a* by performing the dynamic module loading code, in operation 202.

When the necessary firmware operation module is loaded to the dynamic allocation area 100*a*, the host issues a module execution command to the optical drive, in operation 204.

In operation 206, in response to the module execution command from the host, the optical drive loads the dynamic module execution code stored in the dynamic module execution code area 104*a* to the dynamic allocation area 100*a* and executes the firmware operation module using the dynamic module execution code, in operation 206.

Thereafter, the dynamic allocation area 100*a* is cleared out so that a next firmware operation module can be executed.

As described above, the optical drive debugging code and the optical drive controlling code are downloaded in the flash memory when required, the functions of each code downloaded in the flash memory are executed and each executed code downloaded in the flash memory is then deleted. Therefore, the efficiency of the area of the flash memory is maximized. Also, a firmware having various functions is installed in a small area of the flash memory and efficiently performs operations for debugging and controlling the optical drive in the small area of the flash memory.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A flash memory comprising:
    a first area where a firmware operation module that is received from an external source is temporarily executed and deleted; and
    a second area allocated to store a code for loading the firmware operation module that is stored in the first area, a code for executing the firmware operation module that is stored in the first area, and a firmware code,
    wherein the firmware operation module includes a code for debugging a storage drive and a code for controlling the storage drive, and
    each of the code for loading the firmware operation module stored in the first area and the code for executing the firmware operation module stored in the first area is allocated to an area other than the first and second areas.

2. The flash memory as claimed in claim 1, wherein the firmware operation module is a dynamic module.

3. A flash memory, comprising:
    a storage area temporarily storing operating codes of a hardware device, the operating codes being only during a temporary operation of the hardware device; and
    another storage area storing loading codes for loading each of the temporarily stored operating codes of the hardware device and storing executing codes for executing each of the temporarily stored operating codes of the hardware device,
    wherein the operating codes are stored in the storage area when the operating codes are required to be used and are received from a host,
    the operating codes of the hardware device comprise a debugging code for debugging the hardware device and a code for controlling the hardware device, and
    the loading codes are stored in a separate storage location of the flash memory from the executing codes.

4. The flash memory as claimed in claim 3, wherein the operating codes of the hardware device comprise a firmware operation module.

5. The flash memory as claimed in claim 3, wherein the hardware device is an optical drive.

6. The flash memory as claimed in claim 3, wherein the storage area is a dynamic allocation where the operating codes are stored, executed, and deleted.

7. A method of dynamically allocating an operating code in a flash memory, comprising:
   temporarily storing the operating code of a hardware device that is used a only during a temporary operation of the hardware device in a dynamic storage area;
   allocating another storage area for storing a loading code to load the temporarily stored operating code of the hardware device and storing an executing code to execute the temporarily stored operating code of the hardware device; and
   storing the loading code in a separate storage location of the flash memory from the executing code,
   wherein the operating code is stored in the dynamic storage area when the operating code is required to be used and is received from a host, and
   the operating code of the hardware device comprises a debugging code for debugging the hardware device and a code for controlling the hardware device.

8. The method of dynamically allocating the operating code in the flash memory as claimed in claim 7, wherein the operating code of the optical drive comprises a firmware operation module.

9. The method of dynamically allocating the operating code in the flash memory as claimed in claim 7, wherein the hardware device is an optical drive.

10. The method of dynamically allocating the operating code in the flash memory as claimed in claim 7, further comprising:
    deleting the operation code temporarily stored in the dynamic allocation storage area after executing the operating code.

11. The method of dynamically allocating the operating code in the flash memory as claimed in claim 7, further comprising:
    clearing the dynamic allocation storage area after executing the operating code.

12. The method of dynamically allocating the operating code in the flash memory as claimed in claim 7, wherein the loading code and executing code are stored in separate, predefined areas of the flash memory.

* * * * *

UNITED STATES PATENT AND TRADEMARK OFFICE
CERTIFICATE OF CORRECTION

PATENT NO.       : 7,814,261 B2
APPLICATION NO.  : 11/003520
DATED            : October 12, 2010
INVENTOR(S)      : Ki-Ju Lee It is certified that error appears in the above-identified patent and that said Letters Patent is hereby corrected as shown below:

Column 4, Line 45 in Claim 3, after "being" insert -- used --.

Column 5, Line 4 in Claim 7, after "used" delete "a".

Column 5, Line 21 in Claim 8, delete "optical drive" and insert -- hardware device --, therefor.

Signed and Sealed this
Eleventh Day of January, 2011

David J. Kappos
*Director of the United States Patent and Trademark Office*